United States Patent
Lee et al.

(10) Patent No.: US 11,067,248 B1
(45) Date of Patent: Jul. 20, 2021

(54) MULTIPLE LIGHT CONTROL LENSES FOR ASYMMETRIC LIGHT DISTRIBUTION

(71) Applicant: HL OPTICS CO., LTD., Hwaseong-si (KR)

(72) Inventors: Kang Hyun Lee, Pyeongtaek-si (KR); In Myeong Hwang, Ansan-si (KR); Seok Chae Ko, Jecheon-si (KR)

(73) Assignee: HL OPTICS CO., LTD., Hwaseong-si (KR)

( * ) Notice: Subject to any disclaimer, the term of this patent is extended or adjusted under 35 U.S.C. 154(b) by 0 days.

(21) Appl. No.: 17/116,484

(22) Filed: Dec. 9, 2020

(30) Foreign Application Priority Data

Apr. 28, 2020 (KR) .................. 10-2020-0051567

(51) Int. Cl.
　　*F21V 21/00*　　(2006.01)
　　*F21V 5/04*　　(2006.01)
　　*G02B 3/08*　　(2006.01)

(52) U.S. Cl.
　　CPC .............. *F21V 5/045* (2013.01); *G02B 3/08* (2013.01); *F21V 5/04* (2013.01)

(58) Field of Classification Search
　　CPC ... F21V 5/045; F21V 5/04; F21V 5/08; G02B 3/08
　　USPC .......................................... 362/257, 311.02
　　See application file for complete search history.

(56) References Cited

U.S. PATENT DOCUMENTS

| | | | |
|---|---|---|---|
| 7,703,950 B2* | 4/2010 | Ewert | B29C 45/0025 362/339 |
| 9,080,739 B1 | 7/2015 | Sayers | |
| 9,804,443 B2* | 10/2017 | Hwang | G02F 1/133605 |
| 2011/0164425 A1 | 7/2011 | Chen et al. | |
| 2013/0320843 A1* | 12/2013 | Lee | H05B 33/04 313/512 |
| 2014/0056007 A1* | 2/2014 | Chou | G02B 19/0066 362/308 |
| 2014/0177208 A1* | 6/2014 | Lin | G02B 19/0014 362/97.3 |
| 2015/0219286 A1* | 8/2015 | Yoon | G02B 3/00 362/311.02 |
| 2015/0323729 A1 | 11/2015 | Takatori et al. | |
| 2017/0114979 A1* | 4/2017 | Kang | F21V 7/04 |
| 2017/0248822 A1 | 8/2017 | Pelka | |
| 2018/0172221 A1* | 6/2018 | Kim | F21V 5/045 |

* cited by examiner

*Primary Examiner* — Laura K Tso
(74) *Attorney, Agent, or Firm* — Knobbe Martens Olson & Bear LLP (57) ABSTRACT

A lens can includes a disc-shaped diffusion part in which a top surface central part thereof is lower than a top surface edge part, and a concave accommodation part that is formed on a center of a bottom surface of the diffusion part and provides a space in which a light source is accommodated therein, wherein a plane of incidence to which a light of the light source is incident is formed on an interface between the concave accommodation part and the diffusion part, wherein the plane of incidence includes a plate-shaped surface in which a height of an edge part is lower than a central part thereof; and a vertical side surface extending from an edge of the plate-shaped surface to a bottom surface of the diffusion part.

7 Claims, 12 Drawing Sheets

MULTIPLE LIGHT CONTROL LENSES FOR ASYMMETRIC LIGHT DISTRIBUTION

CROSS-REFERENCE TO RELATED APPLICATION

This application claims priority to and the benefit of Korean Patent Application No. 10-2020-0051567, filed on Apr. 28, 2020, the disclosure of which is incorporated herein by reference in its entirety.

BACKGROUND

Field

The present disclosure relates to a multiple light control lens with an asymmetric light distribution, and more particularly, to lenses capable of being reduced in their size.

Discussion of Related Art

Direct back light unit (BLU), which uses LEDs, applies a secondary lens individually for each LED for the purpose of light diffusion.

The secondary lens has an isotropic or anisotropic light distribution characteristics used optionally as needed.

Lenses applied to the direct back light unit are those that allow the light emitted from the LED to pass through the face of the lens, diffuse and be irradiated to a wider area, and require an increase in the size of the lens or an increase in the optical distance to irradiate light to a wider area.

This is needed to increase the output of individual LED in order to improve price competitiveness and to allow to irradiate light of individual LED through the lens to a wider area, with the number of LEDs per unit area reduced.

However, the increase in the size of the lens may reduce productivity and increase management costs, thereby reducing competitiveness. Also, the increase in the optical distance would not meet the demand for weight lightening of the product.

The disclosure of this section is to provide background information relating to the invention. Applicant does not admit that any information contained in this section constitutes prior art.

SUMMARY

The present disclosure is directed to providing a lens capable of being reduced in its size and weight.

Also, the present disclosure is directed to providing a lens capable of increasing a light irradiation area by designing a light diffusion process of a diffusion lens to further include a light reflection mechanism as well as a light incident and diffusion mechanism.

In addition, the present disclosure is directed to providing a lens capable of adjusting light distribution characteristics by partial changes in shape.

The present disclosure is directed to providing a lens including: a disc-shaped diffusion part in which a top surface central part thereof may be lower than a top surface edge part, and a concave accommodation part that is formed on a center of a bottom surface of the diffusion part and provides a space in which a light source is accommodated therein, wherein a plane of incidence to which a light of the light source is incident may be formed on an interface between the concave accommodation part and the diffusion part, wherein the plane of incidence may include a plate-shaped surface in which a height of an edge part is lower than a central part thereof; and a vertical side surface extending from an edge of the plate-shaped surface to a bottom surface of the diffusion part, wherein the vertical side surface may have a minimum height and a maximum height depending on a position, wherein a curved surface may be between the minimum height and the maximum height.

According to an embodiment of the present invention, the minimum height is a lowest height from the bottom surface of the diffusion part to a point on an upper end of the vertical side surface, and a pair of points of the minimum height are located at a position symmetrical around the central part, and the maximum height is a highest height from the bottom surface of the diffusion part to a point on an upper end of the vertical side surface, and a pair of points of the maximum height are located at a position symmetrical around the central part.

According to an embodiment of the present invention, the plate-shaped surface may have a non-square polygonal structure in which vertices are rounded, and a lower end of the vertical side surface may have a non-square polygonal structure in which vertices are rounded.

According to an embodiment of the present invention, in the diffusion part where the top surface is a curved surface, considering a line connecting from the top surface central part to the top surface edge part, some lines may form a single curve of a first curvature, some lines may form a curve of a second curvature different from the first curvature, and other lines may form a blending curve of the first curvature and the second curvature, wherein the first curvature may form a curved surface that is convex upward and the second curvature may form a curved surface that is convex downward.

A lens according to another aspect of the present invention may include a disc-shaped diffusion part in which a top surface central part thereof is lower than a top surface edge part, and a concave accommodation part that is formed on a center of a bottom surface of the diffusion part and provides a space in which a light source is accommodated therein, wherein a bottom surface of the concave accommodation part has a non-square polygonal structure in which vertices are rounded, wherein a plane of incidence to which a light of the light source is incident is formed on an interface between the concave accommodation part and the diffusion part, wherein the plane of incidence includes a plate-shaped surface in which a height of an edge part is lower than a central part thereof; and a vertical side surface extending from an edge of the plate-shaped surface to a bottom surface of the diffusion part, wherein the vertical side surface has a minimum height and a maximum height depending on a position, wherein a curved surface is between the minimum height and the maximum height.

According to an embodiment of the present invention, the minimum height is a lowest height from the bottom surface of the diffusion part to a point on an upper end of the vertical side surface, and a pair of points of the minimum height are located at a position symmetrical around the central part, and the maximum height is a highest height from the bottom surface of the diffusion part to a point on an upper end of the vertical side surface, and a pair of points of the maximum height are located at a position symmetrical around the central part.

According to an embodiment of the present invention, a pair of points of the maximum height and a pair of points of the minimum height may be positioned 90 degrees rotated each other on a plane with respect to the central part.

According to an embodiment of the present invention, the top surface of the diffusion part may be a curved surface in which a top surface central part is lower than a top surface edge part.

According to an embodiment of the present invention, considering a line connecting from the top surface central part to the top surface edge part, some lines may form a single curve of a first curvature, some lines may form a curve of a second curvature different from the first curvature, and other lines may form a blending curve of the first curvature and the second curvature, wherein the first curvature may form a curved surface that is convex upward and the second curvature may form a curved surface that is convex downward.

The lens according to an embodiment of the present invention is capable of forming asymmetric light distribution by changing the shape of the light emitting part and by controlling the shape of the plane of incidence, thereby reducing the size and providing a wider area of light distribution which can reduce the thickness and weight of the back light unit when the lens is applied to the back light unit.

In addition, embodiments of the present invention can provide a lens that satisfies various light distribution characteristics by changing the shape of the light incident part to adjust the light distribution characteristics.

Also, embodiments of the present invention can provide an asymmetry to the light emitting part, but provide an asymmetric structure that can be implemented in a thin lens compared to an example dome-shaped lens, thereby reducing the thickness thereof which can reduce the thickness and weight of the back light unit.

BRIEF DESCRIPTION OF THE DRAWINGS

The above and other aspects, features, and advantages of the present invention will become more apparent to those of ordinary skill in the art by describing embodiments thereof in detail with reference to the accompanying drawings, in which.

DETAILED DESCRIPTION OF EMBODIMENTS

Hereinafter, in order to fully understand the configuration and effects of the present invention, embodiments of the present invention will be described with reference to the accompanying drawings. However, the present invention is not limited to the embodiments disclosed below, and may be embodied in various forms and various modifications may be made. Rather, the description of embodiments of the present invention is provided so that this disclosure will be thorough and complete and will fully convey the concept of the invention to those of ordinary skill in the art. In the accompanying drawings, the size of the components is enlarged compared to actual ones for the convenience of description, and the ratio of each component may be exaggerated or reduced.

Terms such as 'the first' and 'the second' may be used to describe various elements, but, the above elements should not be limited by the terms above. The terms may only be used to differentiate one element from another. For example, without departing from the scope of the present invention, 'the first element' may be named 'the second element' and similarly, 'the second element' may also be named 'the first element.' In addition, expressions in the singular include plural expressions unless explicitly expressed differently in context. Unless otherwise defined, the terminology used in the embodiments of the present invention may be interpreted as meanings commonly known to those of ordinary skill in the art.

Figure 1:
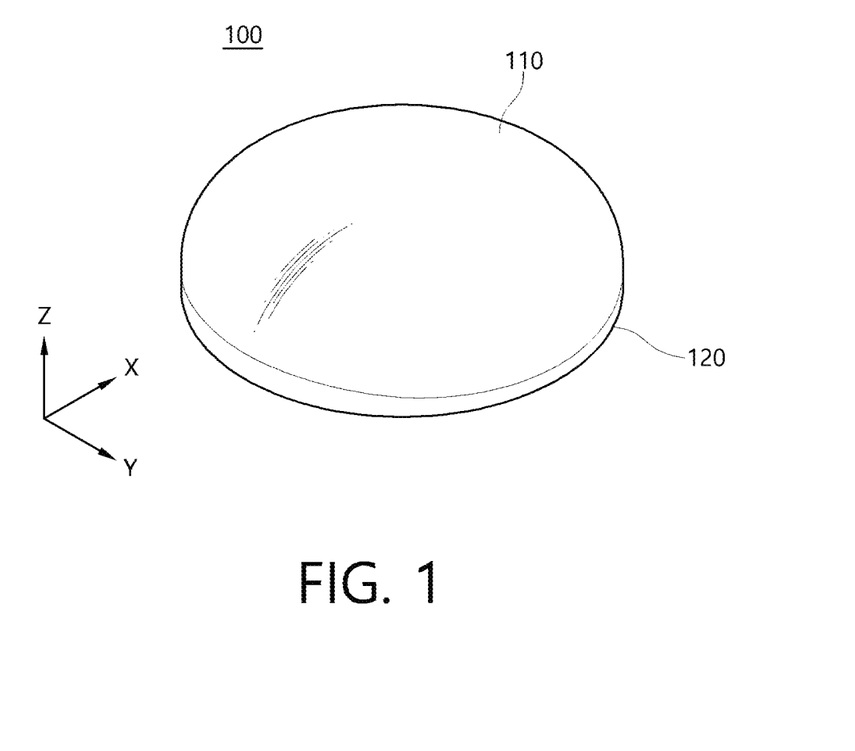
FIG. 1 is a perspective view of an example asymmetric light distribution lens.
Figure 2:
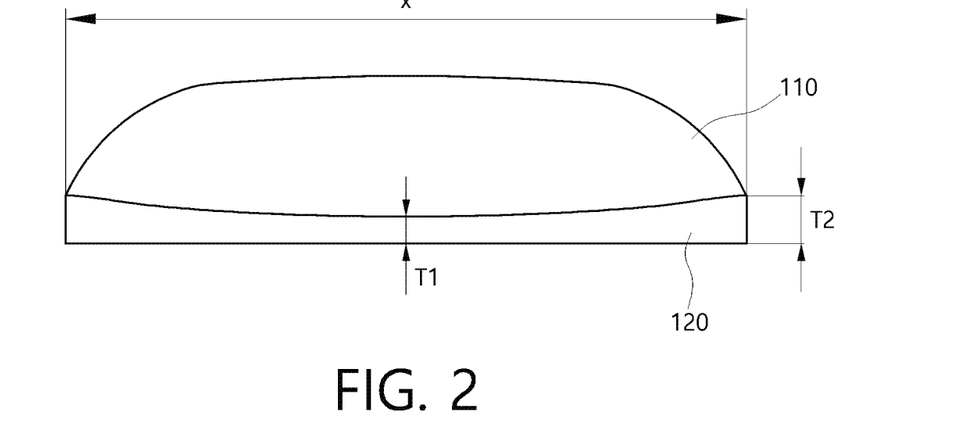
FIG. 2 is a side view in the y-axis direction in FIG. 1.
Figure 3:
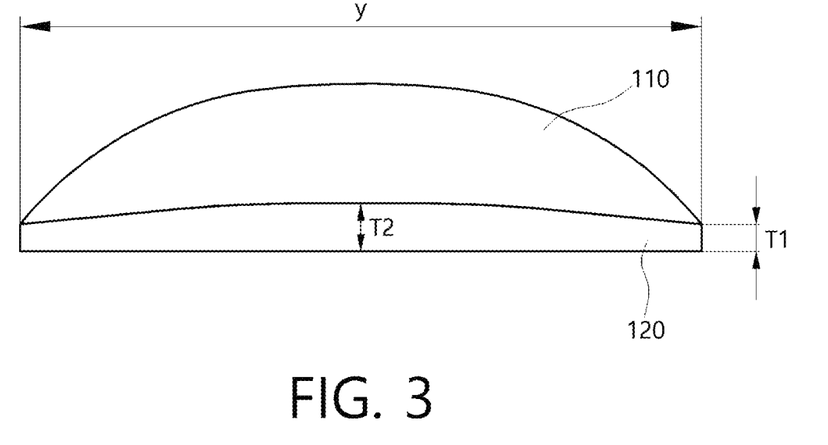
FIG. 3 is a side view in the x-axis direction in FIG. 1.

FIG. 1 is a perspective view of an example asymmetric light distribution lens, FIG. 2 is a side view in the y-axis direction in FIG. 1, and FIG. 3 is a side view in the x-axis direction in FIG. 1.

Referring to FIGS. 1 to 3 respectively, an example asymmetric light distribution lens 100 includes a dome-type light emitting part 110 having an asymmetric curvature, and a side part 120 perpendicular to a mounting surface at the edge of the dome-type light emitting part 110.

In the illustrated asymmetric light distribution lens 100, there is a difference in curvature of the dome-type light emitting part 110 in the x-axis direction and the y-axis direction, and the height of the side part 120 is also different according to a difference in the shape of the dome-type light emitting part 110.

In the side view of the illustrated asymmetric light distribution lens 100 in FIG. 2 viewed in the y-axis direction, a first height T1, which is the height at the center of the side part 120, is lower than a second height T2, which is the height at the edge of the side part 120.

In contrast, the side view in FIG. 3 viewed in the x-axis direction is substantially the same as the structure in which the asymmetric light distribution lens of FIG. 2 is horizontally rotated 90 degrees to the left or right, and thus the center of the side part 120 has the second height T2 and the edge of the side part 120 has the first height T1.

The dome-type light emitting part 110 has the same height from the planar bottom to the center regardless of its direction, and forms a curved surface having a predetermined curvature from the center part to the side part 120 having a different height.

As such, the shape of the dome-type light emitting part 110 has an asymmetric structure in the x-axis direction and the y-axis direction, and thus exhibits asymmetric light distribution characteristics.

Figure 4:
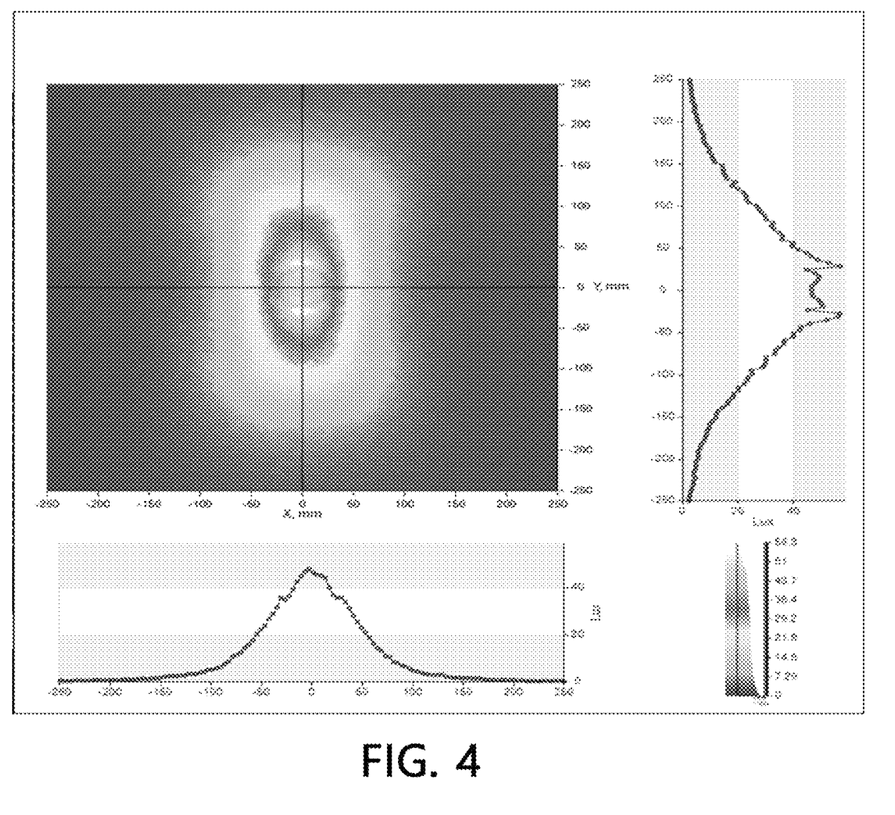
FIG. 4 is a view of simulation result of light distribution characteristics of an example asymmetric light distribution lens.
Figure 5:
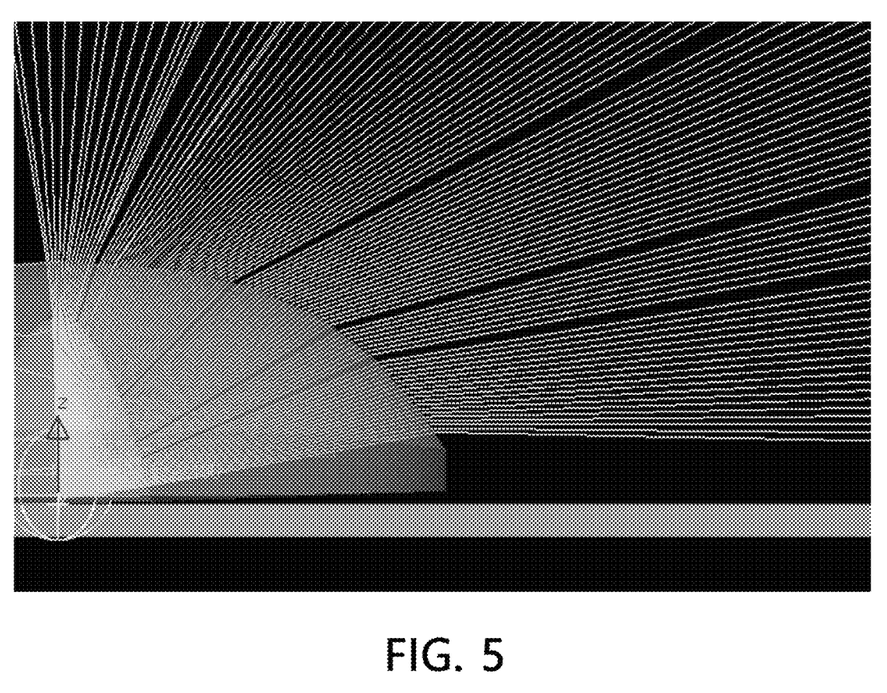
FIG. 5 is a view of simulation result of light diffusion characteristics of an example asymmetric light distribution lens.

FIG. 4 is a simulation result of light distribution characteristics of an example asymmetric light distribution lens 100, and FIG. 5 is a simulation result of light diffusion characteristics of an example asymmetric light distribution lens 100.

As described above, the reason for making asymmetrical light distribution using lenses is to irradiate light to a wider area in one side so as to reduce the number of LEDs.

The illustrated asymmetric light distribution lens 100 is configured such that after the light of the LEDs is incident through an incident part, it is diffused in the dome type light emitting part 110 and then emitted to the outside.

In order to obtain such asymmetric light distribution, a dome-shaped structure with a curved surface of asymmetric curvature shall be formed with the height of the light distribution lens sufficiently high.

In addition, the size and weight of the lens would be increased when applied to the back light unit since it is necessary to increase the size of the lens or the size of the optical path in order to widen the light irradiation range.

A multiple light control lens with an asymmetric light distribution according to an embodiment of the present invention will be described in detail with reference to the drawings.

Figure 6:
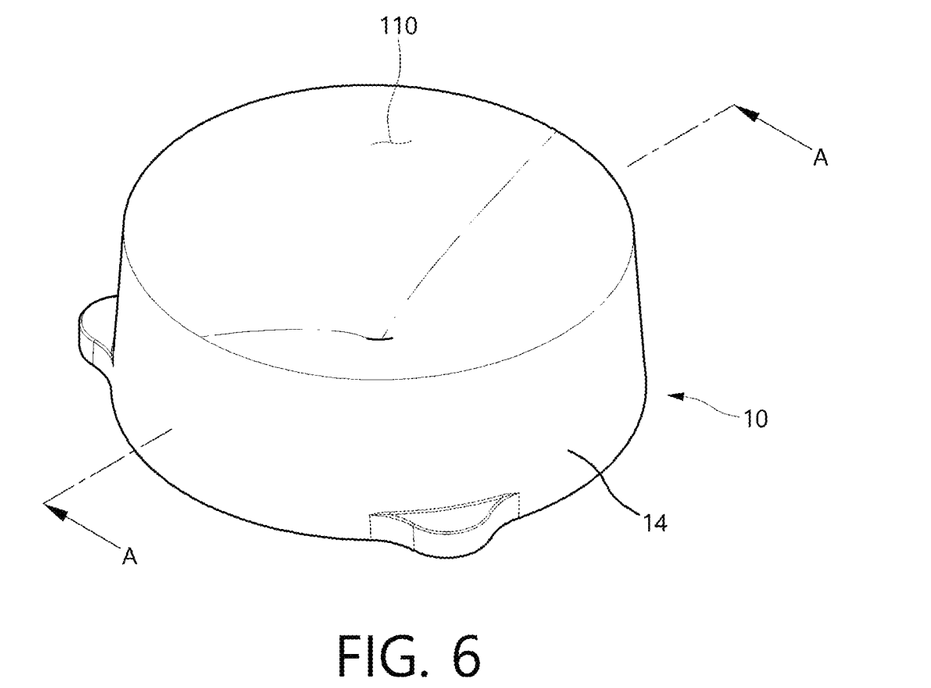
FIG. 6 is a perspective view of a lens according to an embodiment of the present invention.
Figure 7:
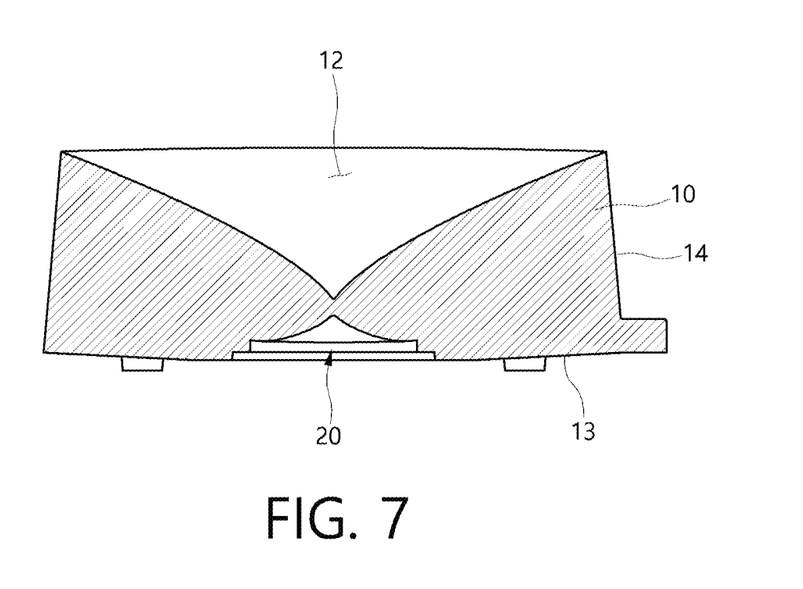
FIG. 7 is a cross-sectional view of FIG. 6.
Figure 8:
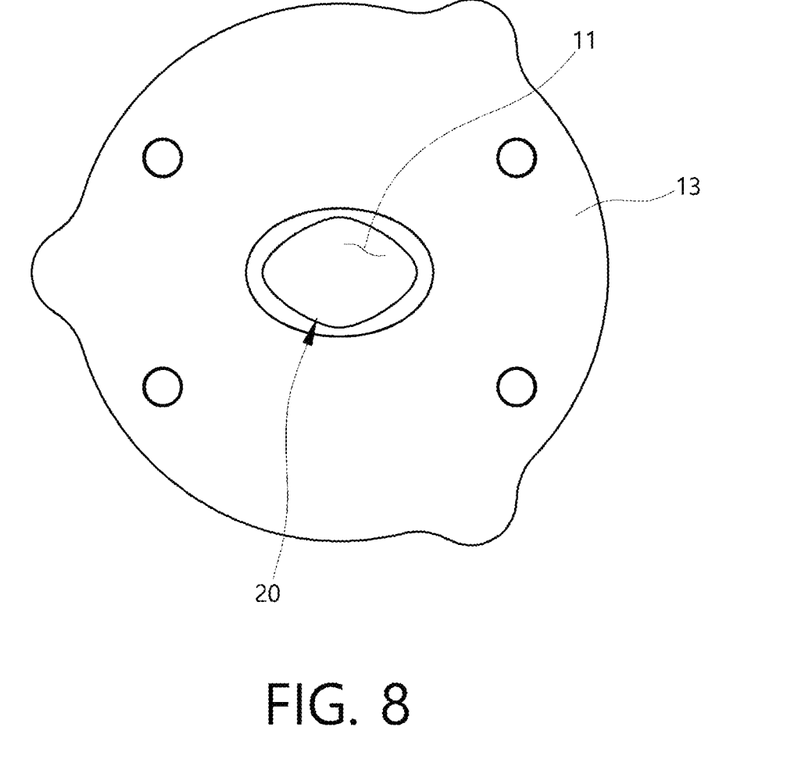
FIG. 8 is a bottom view of FIG. 6.

FIG. 6 is a perspective view of a lens according to an embodiment of the present invention, FIG. 7 is a cross-sectional view of FIG. 6, and FIG. 8 is a bottom view of FIG. 6.

Referring to FIGS. 6 to 8, respectively, a lens according to an embodiment of the present invention includes a disc-shaped diffusion part 10 having a lower height than a diameter, a space in which a LED package is accommodated in the center of the diffusion part 10, and a concave accommodation part 20 that determines the shape of a plane of incidence 11 through which light of the LED package is incident to the diffusion part 10, wherein the height at the center of a top surface 12 of the diffusion part 10 is lower than that of an edge part, and the shape of a bottom surface part of the concave accommodation part 20 has at least four sides that are not round or oval, with a contact point of each side (vertex) forming a curved line of a predetermined curvature.

Hereinafter, the configuration and operation of embodiments of the present invention configured as described above will be described in more detail.

First, the diffusion part 10 has a disc-shaped structure in which the diameter of the bottom surface 13 is larger than the diameter of the top surface 12. In other words, a side surface 14 has an inclined structure.

The top surface 12 has a concave shape. In other words, the center of the top surface is located at a lower position than the edge.

The surface from the edge to the center of the top surface 12 is not a flat surface but a curved surface having a predetermined curvature.

In the central part of the bottom surface 13, a concave accommodation part 20 is formed where the LED package is accommodated.

In embodiments, the concave accommodation part 20 may be formed by processing the center of the bottom surface 13 of the diffusion part 10 and forming a groove.

In this case, the concave accommodation part 20 allows the LED package protruding from a substrate to be accommodated when the diffusion part 10 is coupled to the upper portion of the substrate on which the LED package is mounted.

In addition, the characteristics of the concave accommodation part 20 determines the shape of the plane of incidence 11 through which light of the LED package is incident to the diffusion part 10.

Figure 9:
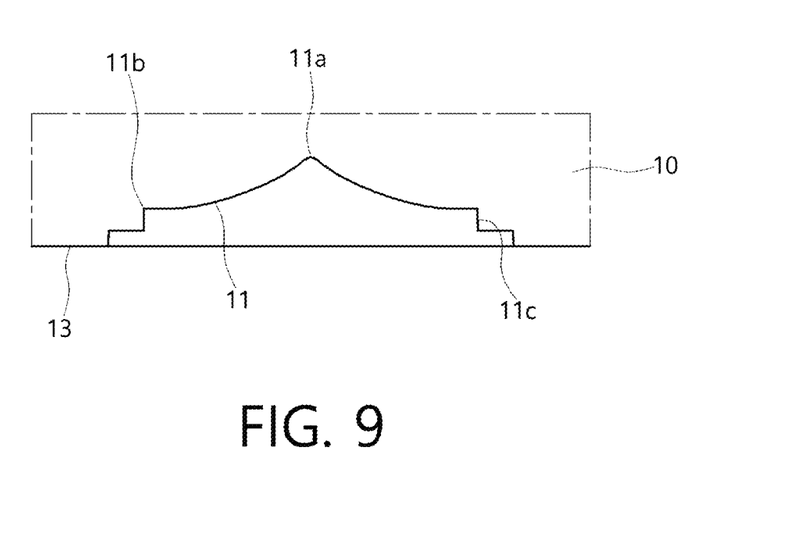
FIG. 9 is an enlarged cross-sectional view of a plane of incidence applied to one embodiment of the present invention.

FIG. 9 is an enlarged cross-sectional view of the plane of incidence 11.

Referring to FIG. 9, the plane of incidence 11, which is an interface between the concave accommodation part 20 and the diffusion part 10, is located at a position where the height of a central part 11*a* is higher than the height of an edge part 11*b*.

In addition, a vertical side surface 11*c* is formed from the edge part 11*b* to the bottom surface 13 of the diffusion part 10.

The edge part 11*b* forms the same line as the bottom shape of the concave accommodation part 20, thus the plane of incidence 11 includes a plate-shaped surface from the central part 11*a* to the edge part 11*b* and the vertical side surface 11*c* that provides a tube-shaped surface placed vertically downward from the end of the plate-shaped surface.

The plate-shaped surface from the central part 11*a* to the edge part 11*b* is a curved surface that is convex downward.

One or two or more of the vertical side surfaces 11*c* may be formed from the edge part 11*b* to the bottom surface 13 of the diffusion part 10. When two or more vertical side surfaces are formed, the diameter of the concave accommodation part 10, which is the distance between the vertical side surfaces, increases as it goes downward.

In embodiments, the tube-shaped surface formed by the vertical side surface 11*c* has a configuration in which the diameter of the tube shape increases in stages as it goes downward.

In addition, the shape of the bottom surface of the concave accommodation part 20 may be not round or oval and may be a rhombus shape in which the vertices are rounded.

When the shape of the bottom surface of the concave accommodation part 20 is a rhombus shape, the lower end of the tube-shaped structure formed by the vertical side surface 11*c* has a rhombus shape. In addition, the edge part 11*b*, which is an upper end of the vertical side surface 11*c*, also has a rhombus shape.

Accordingly, the plate-shaped surface from the central part 11*a* to the edge part 11*b* has a rhombus shape with a high center and a low edge, and a curved surface that is convex downward from the central part 11*a* to the edge part 11*b*.

Figure 10:
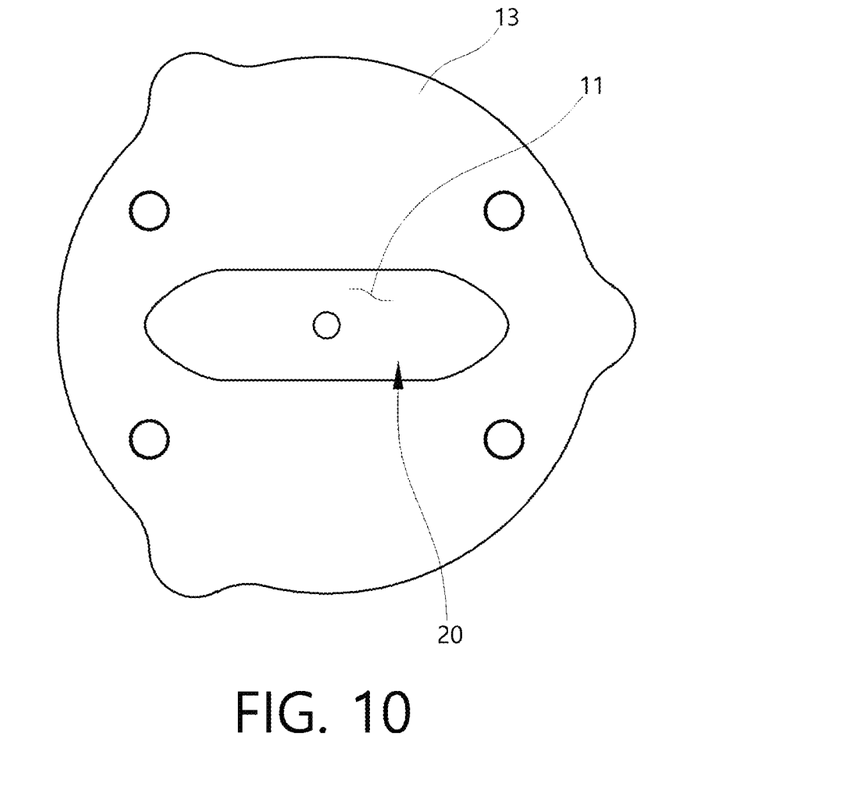
FIG. 10 is a bottom view of a plane of incidence of another embodiment of the present invention.

As another example, as shown in FIG. 10, the shape of the bottom surface of the concave accommodation part 20 may be a rectangular hexagon shape in which the vertices are rounded.

Therefore, the lower and upper ends of the vertical side surface 11*c* also have a rectangular hexagon shape, and the plate-shaped surface of the upper side of the plane of incidence 11 also has a rectangular hexagonal surface.

As such, the shape of the bottom surface of the concave accommodation part 20 may not be round or oval and may have at least 4 or more even-numbered sides, and some of the sides may be longer than other sides. In other words, the bottom surface of the concave accommodation part 20 has a polygonal structure rather than a square shape.

Therefore, the plane of incidence 11 of the diffusion part 10 defined by the concave accommodation part 20 may have a longer shape to one side, and an asymmetric light distribution may be formed by changing an incident angle of the light emitted from the LED package located in the center of the concave accommodation part 20.

Embodiments of the present invention may be possible to form an asymmetric light distribution by changing the design of the plane of incidence 11 of the diffusion part 10 to which the light of the LED package is incident, without changing the shape of the top surface of the diffusion part 10 to be suitable for asymmetric light distribution.

In particular, in embodiments of the present invention, light is partially reflected in some part by the shape of the lower side of the plane of incidence 11 including a plurality of sides that are not round or oval and a rounded portion where the sides are in contact with each other. A desired light distribution pattern can be formed by this reflection mechanism.

Accordingly, according to embodiments of the present invention, an asymmetric light distribution may be obtained without increasing the height of the diffusion part 10 of the lens to obtain asymmetric light distribution, and without forming an asymmetric structure along the x-axis and y-axis directions.

Figure 11:
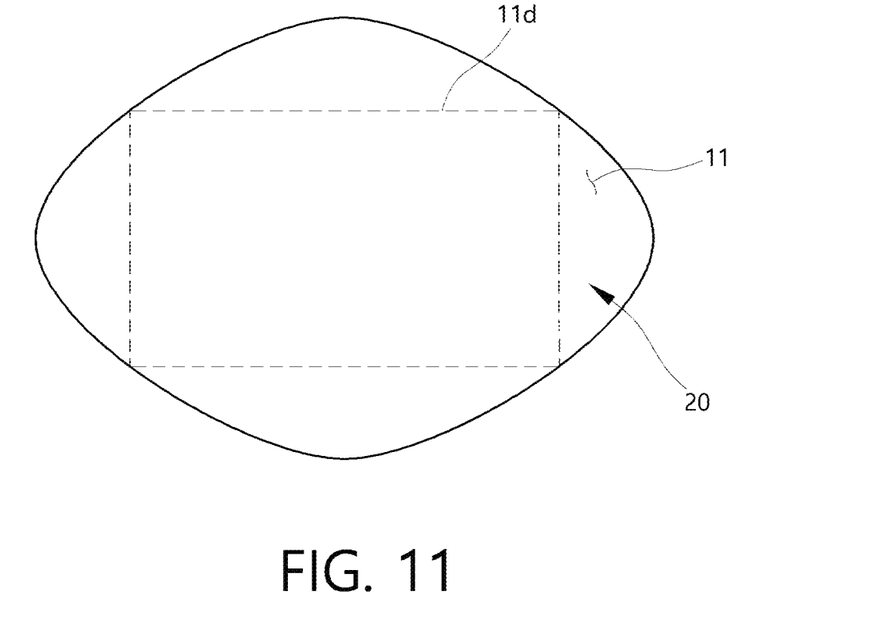
FIG. 11 is a bottom view of a plane incidence for explaining the direction of asymmetric light distribution.

FIG. 11 is a bottom view of a plane incidence 11 for explaining the direction of asymmetric light distribution.

The plane incidence 11 or the bottom surface of the concave accommodation part 20 may have four-line segments in a rhombus shape, wherein the four-line segments may be contact with each other and the contacting portion may have a round shape.

In this case, considering a virtual quadrangle 11*d* in which a vertex is located at the center of each line segment, the virtual quadrangle 11*d* becomes a rectangle, and the light is further diffused toward the shorter side to form a light distribution that emits light further away.

Therefore, an asymmetric light distribution pattern may be formed by a difference in the plane of incidence 11 due to the shape of the concave accommodation part 20.

Figure 12:
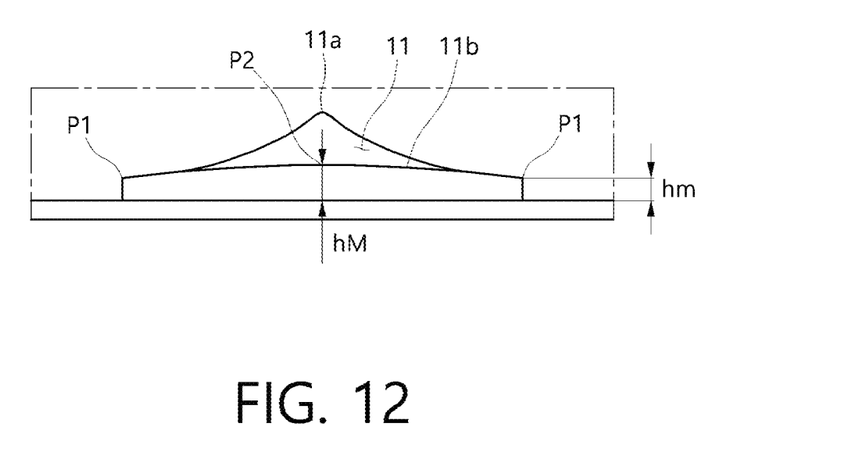
FIGS. 12 and 13 are cross-sectional views of a plane of incidence of another embodiment of the present invention, respectively.
Figure 13:
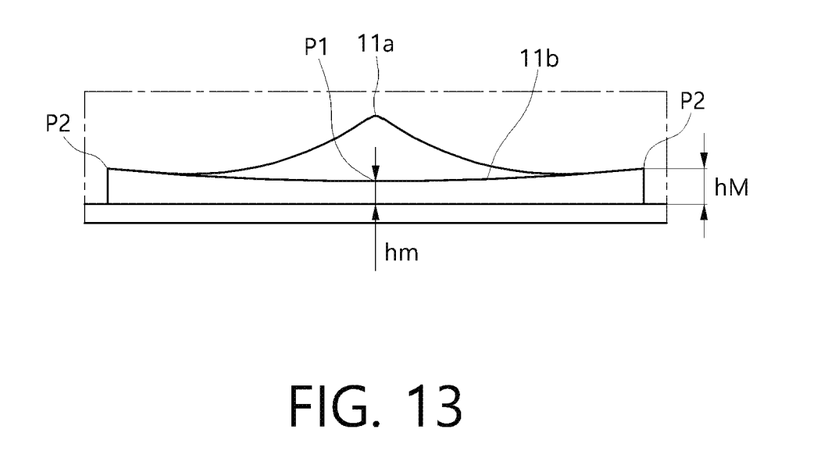

FIGS. 12 and 13 are cross-sectional views of a plane of incidence 11 of another embodiment of the present invention.

FIG. 12 is a cross-sectional view in a specific axial direction such as x, and FIG. 13 is a cross-sectional view in an axial direction orthogonal to the axis of FIG. 12.

As another embodiment of the plane of incidence 11 defined by the concave accommodation part 20, as mentioned above, it may have a structure having a central part 11*a*, an edge part 11*b* and a vertical side surface 11*c* wherein the height of the edge part 11*b* may be different depending on the position.

In embodiments, the edge part 11*b* may have a minimum height hm and a maximum height hM.

For example, in FIG. 12 which is a cutting plane in the x-axis direction, both ends of the left and right sides of the edge part 11*b* are a first point P1, and the center portion is a second point P2.

In this case, the second point P2 becomes the maximum height hM.

Referring to FIG. 13, a cross section in which the shape of FIG. 12 is rotated 90 degrees on the plane, the second point P2 is located at both left and right ends of the edge part 11*b*, and the first point P1 is located at the center portion.

In this case, the first point P1 becomes the minimum height hm of the edge part 11*b*.

In addition, a corner portion of the edge part 11*b* connecting the first point P1 and the second point P2 forms a curved surface.

In such a structure, a difference in height of the edge part 11*b*, in other words, a difference in height of the vertical side surface 11*c* causes a difference in the degree of light diffusion.

A portion having the minimum height hm diffuses the light farther than a portion having the maximum height hM.

This can be understood because the smaller the area of the light emitting surface is, the more light is concentrated and the dispersion effect is reduced.

The first point P1 is a point on the upper side of the vertical side surface 11*c*, and a pair is located at a position symmetrical around the central part 11*a*. In addition, the second point P2 is also a point on the upper side of the vertical side surface 11*c*, and a pair is located at a position symmetrical around the central part 11*a*.

As mentioned above, the first point P1 and the second point P2 are positioned 90 degrees rotated each other in a horizontal direction.

The above-described example and a light distribution control by a portion having a difference in height of the vertical side surface 11*c* described with reference to FIGS. 12 and 13 may be combined.

By matching the direction for which the shorter side of the virtual quadrangle 11*d* described with reference to FIG. 11 and the edge part 11*b* having the minimum height are directed, light can be diffused farther.

Figure 14:
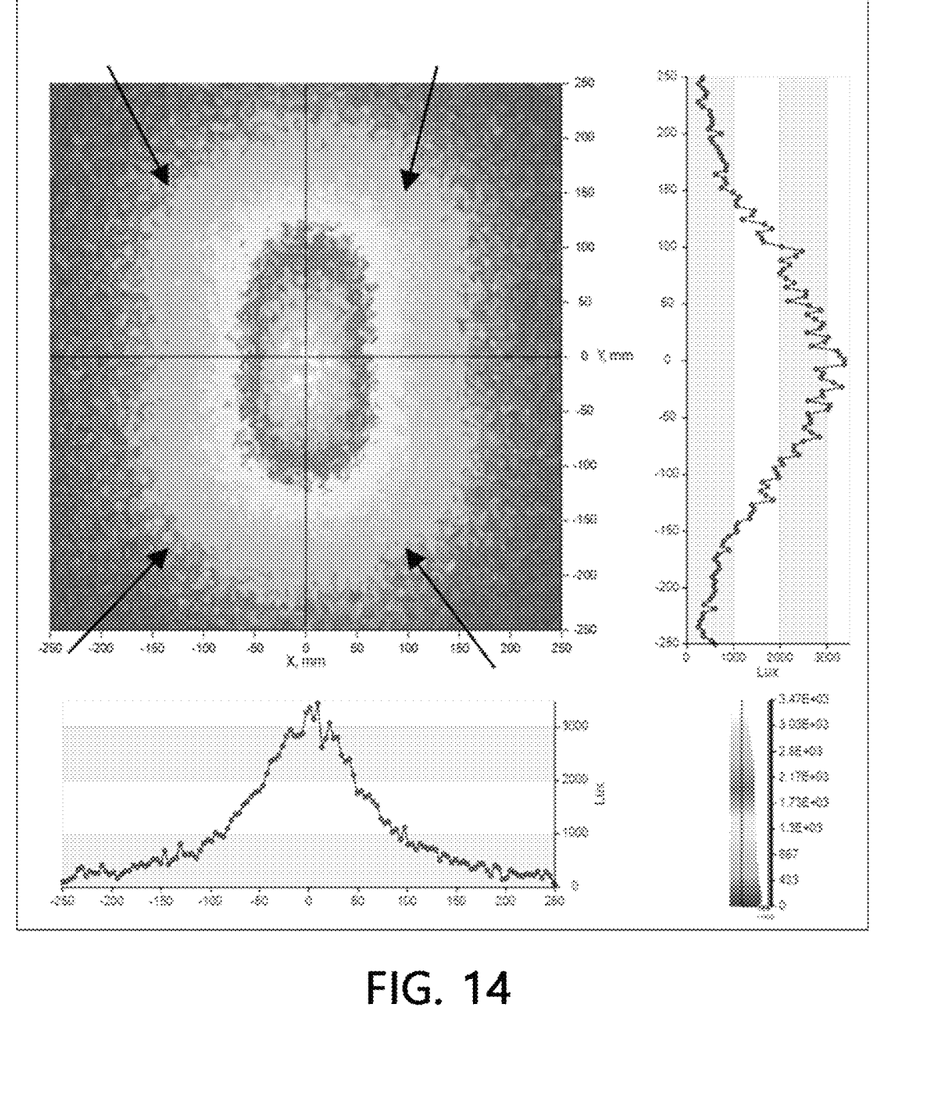
FIG. 14 is a simulation result of light distribution of a lens according to one embodiment of the present invention in which the height of the edge part is constant.

FIG. 14 is a simulation result of light distribution of a lens according to embodiments of the present invention in which the height of the edge part 11*b* is constant, and it may be seen that asymmetric light distribution is formed by the shape of the bottom surface of the plane of incidence 11.

Figure 15:
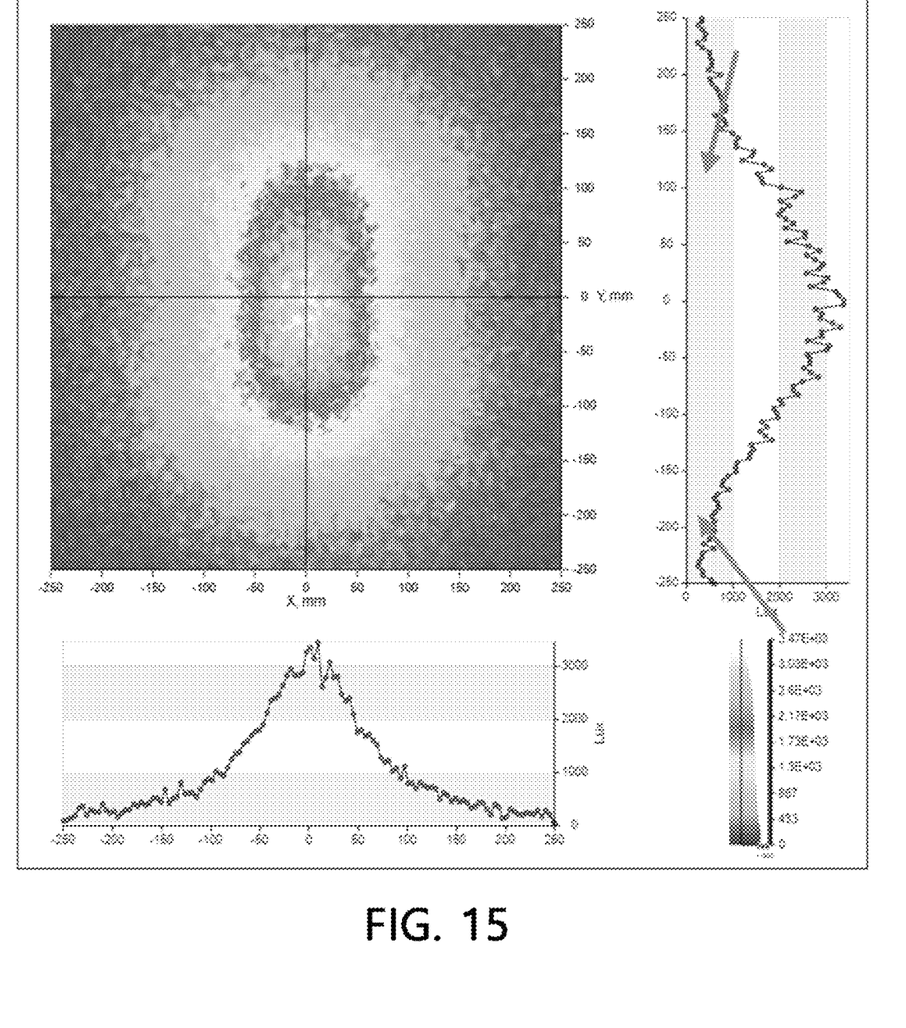
FIG. 15 is a simulation result of light distribution of a lens according to another embodiment of the present invention in which the height of the edge part is not constant.

In addition, FIG. 15 is a simulation result of light distribution of a lens according to another embodiment of the present invention in which the height of the edge part 11*b* is not constant.

From the FIG. 15, it can be seen that asymmetry of the light distribution is further expanded.

Figure 16:
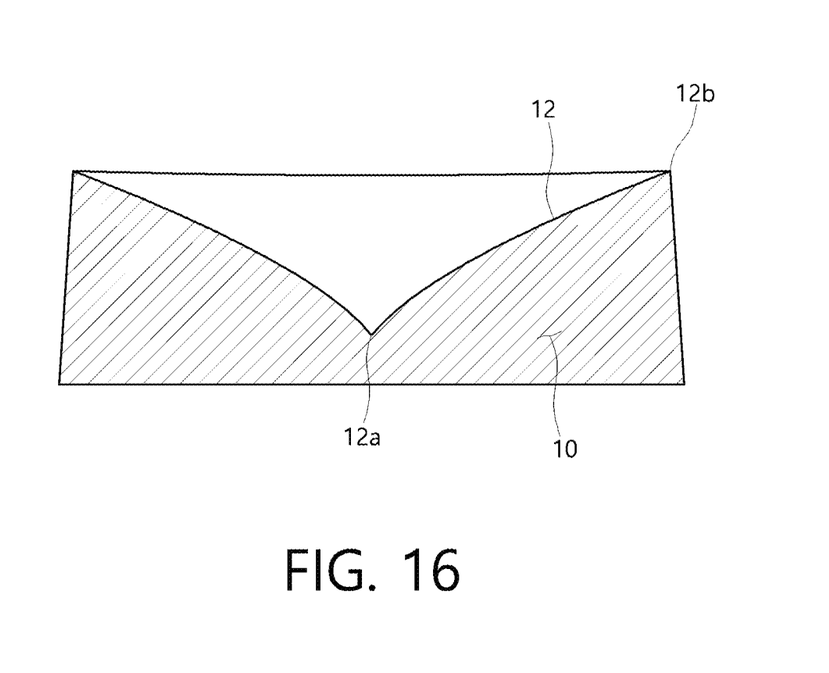
FIGS. 16 and 17 are partial cross-sectional views of a diffusion part, respectively.
Figure 17:
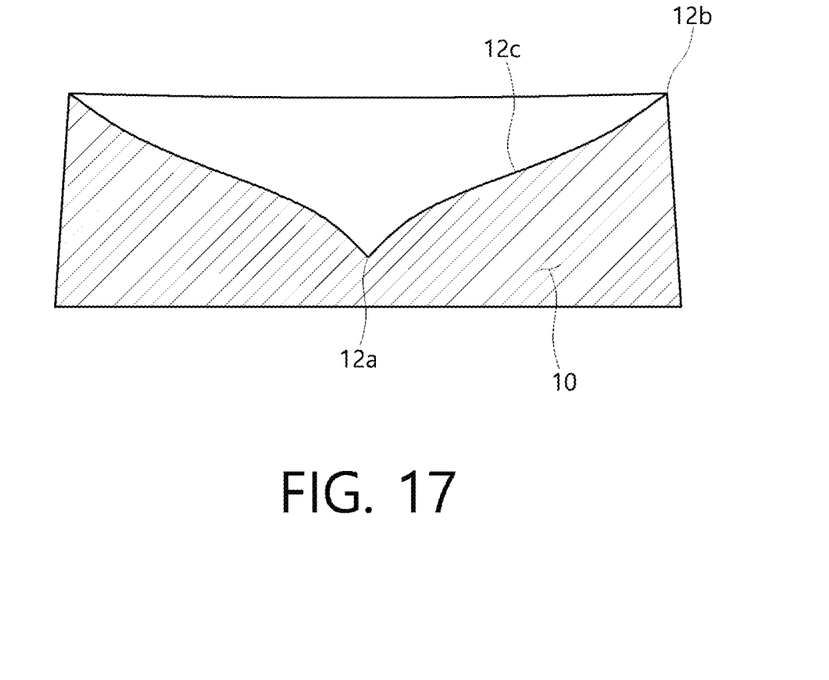

FIGS. 16 and 17 show partial cross sections of a diffusion part 10, respectively.

FIGS. 16 and 17 show only a part of the upper diffusion part 10 of the concave accommodation part 20, and FIG. 16 shows a cross section in a specific axial direction such as x-axial direction, and FIG. 17 shows a cross section in which FIG. 16 is rotated 90 degrees in a horizontal state.

A top surface central part 12*a* forming the top surface 12 of the diffusion part 10 has a lowest height, and a top surface edge part 12*b* has a highest height. The top surface portion extending from the top surface edge part 12*b* to the top surface central part 12*a* forms a curved surface rather than a flat surface, the curvature of the curved surface shows different aspects depending on the location.

For example, as shown in FIG. 16, a surface having a constant curvature may be formed from the top surface central part 12*a* to the top surface edge part 12*b* in the cross section in the x-axis direction. In this case, a surface between the top surface central part 12*a* and the top surface edge part 12*b* forms a curved surface that is convex at the center side.

In a cross section in the y-axis direction orthogonal to the x-axis direction, the curvature may be configured to change with respect to the center point 12*c*.

The center point 12c is assumed to be a point located on the radius between the top surface central part 12a and the top surface edge part 12b.

A surface between the top surface central part 12a and the center point 12c may be a convex curved surface, whereas a surface between the center point 12c and the top surface edge part 12b may be a concave curved surface.

In this case, the concave surface between the center point 12c and the top surface edge part 12b serves to disperse the emitted light, and the other convex curved surface serves to condense the emitted light.

When dispersing light from the top surface 12, a wider light distribution is formed, and when condensing light from the top surface 12, a relatively narrower light distribution is formed.

Accordingly, by forming a portion of the top surface 12 in which the curvature is changed in a direction in which light is to be irradiated farther, asymmetry of the asymmetric light distribution can be further increased.

This means that the asymmetry of light distribution can be further increased by the shape of the plane of incidence 11 and the arrangement of the top surface 12. In addition, the shape of the plane of incidence 11, the arrangement of the vertical side surface 11c of the plane of incidence 11, and the arrangement of the top surface 12 may all be combined to increase the asymmetry of the light distribution as much as possible.

As such, the lens according to embodiments of the present invention may produce light distribution having various characteristics by combining elements involved in asymmetry.

Figure 18:
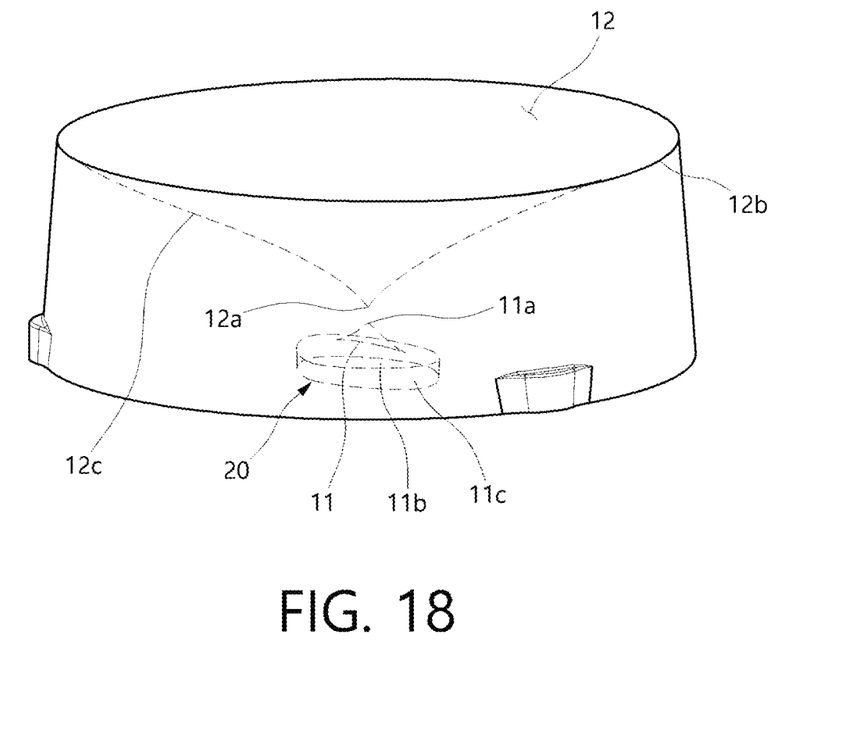
FIG. 18 is a perspective projection view of a lens according to another embodiment of the present invention.

FIG. 18 is a perspective projection view according to another embodiment of the present invention.

An implementation shown in FIG. 18 has a structure including all elements capable of controlling light distribution according to various embodiments of the present invention described above.

Specifically, the edge part 11b forming the edge of the upper plate-shaped surface of the plane of incidence 11 has an oval structure, and a difference is provided at the height of the vertical side surface 11c thereof to allow control of the light distribution.

In addition, considering a line 12b connecting from the top surface 12 central part 12a to the top surface edge part, some lines form a single curve of a first curvature, and other lines form a blending curve of the first curvature and a second curvature wherein the first curvature forms a curved surface that is convex upward and the second curvature forms a curved surface that is convex downward.

In addition, the plane of incidence 11 may be oval, and the top surface edge part of the top surface 12 may be oval or round.

As described above, embodiments of the present invention may control light distribution by changing various elements.

While this invention has been described in connection with what is presently considered to be embodiments, those skilled in the art may understand that the invention is not limited to the disclosed embodiments, but, on the contrary, is intended to cover various modifications and equivalent arrangements included within the spirit and scope of the appended claims. Accordingly, the scope of the present invention shall be determined only according to the attached claims.

What is claimed is:

1. A lens comprising: a disc-shaped diffusion part in which a top surface central part thereof is lower than a top surface edge part, and
a concave accommodation part that is formed on a center of a bottom surface of the diffusion part and provides a space in which a light source is accommodated therein,
wherein a plane of incidence to which a light of the light source is incident is formed on an interface between the concave accommodation part and the diffusion part,
wherein the plane of incidence comprises a plate-shaped surface in which a height of an edge part is lower than a central part thereof; and a vertical side surface extending from an edge of the plate-shaped surface to a bottom surface of the diffusion part,
wherein the vertical side surface has a minimum height and a maximum height depending on a position,
wherein a curved surface is between the minimum height and the maximum height.

2. The lens of claim 1, wherein the minimum height is a lowest height from the bottom surface of the diffusion part to a point on an upper end of the vertical side surface, and a pair of points of the minimum height are located at a position symmetrical around the central part,
wherein the maximum height is a highest height from the bottom surface of the diffusion part to a point on an upper end of the vertical side surface, and a pair of points of the maximum height are located at a position symmetrical around the central part.

3. The lens of claim 1, wherein the plate-shaped surface has a non-square polygonal structure in which vertices are rounded,
wherein a lower end of the vertical side surface has a non-square polygonal structure in which vertices are rounded.

4. A lens comprising: a disc-shaped diffusion part in which a top surface central part thereof is lower than a top surface edge part, and
a concave accommodation part that is formed on a center of a bottom surface of the diffusion part and provides a space in which a light source is accommodated therein,
wherein a bottom surface of the concave accommodation part has a non-square polygonal structure in which vertices are rounded,
wherein a plane of incidence to which a light of the light source is incident is formed on an interface between the concave accommodation part and the diffusion part,
wherein the plane of incidence comprises a plate-shaped surface in which a height of an edge part is lower than a central part thereof; and a vertical side surface extending from an edge of the plate-shaped surface to a bottom surface of the diffusion part,
wherein the vertical side surface has a minimum height and a maximum height depending on a position,
wherein a curved surface is between the minimum height and the maximum height.

5. The lens of claim 4, wherein the minimum height is a lowest height from the bottom surface of the diffusion part to a point on an upper end of the vertical side surface, and a pair of points of the minimum height are located at a position symmetrical around the central part,
wherein the maximum height is a highest height from the bottom surface of the diffusion part to a point on an upper end of the vertical side surface, and a pair of points of the maximum height are located at a position symmetrical around the central part.

6. The lens of claim 5, wherein a pair of points of the maximum height and a pair of points of the minimum height are positioned 90 degrees rotated each other on a plane with respect to the central part.

7. The lens of claim 4, wherein the top surface of the diffusion part is a curved surface in which a top surface central part is lower than a top surface edge part.

* * * * *